United States Patent [19]

Hirai et al.

[11] 3,755,002

[45] Aug. 28, 1973

[54] METHOD OF MAKING PHOTOCONDUCTIVE FILM

[75] Inventors: Tadaaki Hirai, Koganei; Eiichi Maruyama, Kodaira; Kiyohisa Inao, Hachioji, all of Japan

[73] Assignee: Hitachi, Ltd., Tokyo, Japan

[22] Filed: Apr. 11, 1972

[21] Appl. No.: 242,949

[30] Foreign Application Priority Data

Apr. 13, 1971 Japan .............................. 46/23086

[52] U.S. Cl. .................. 148/1.5, 148/174, 148/175, 317/234 V, 317/235 AC

[51] Int. Cl. .............................................. H01l 7/36

[58] Field of Search ..................... 148/1.5, 174, 175; 317/234 V, 235 AC

[56] References Cited

UNITED STATES PATENTS

| | | | |
|---|---|---|---|
| 2,844,640 | 7/1958 | Reynolds | 136/89 |
| 3,290,175 | 12/1966 | Cusano et al. | 317/235 AC |
| 3,496,024 | 2/1970 | Ruehrwein | 136/89 |
| 3,531,335 | 9/1970 | Heyerdahl et al. | 148/174 |
| 3,615,877 | 10/1971 | Yamashita | 148/1.5 |

*Primary Examiner*—L. Dewayne Rutledge
*Assistant Examiner*—J. M. Davis
*Attorney*—Paul M. Craig et al.

[57] ABSTRACT

An n-type film consisting of a group II - VI compound is evaporated on a transparent electrode, and heat-treated in an atmosphere containing group VI element or an inert gas. On this n-type film, a p-type film consisting of a vitreous material such as S*e*, T*e* and A*s* is deposited to form a hetero junction, photoconductive film.

The above procedure enables the enhancement of the photosensitivity of a film more than three times as large as that of the conventional one.

11 Claims, 3 Drawing Figures

Patented Aug. 28, 1973 3,755,002

3 Sheets-Sheet 1

Patented Aug. 28, 1973 3,755,002

3 Sheets-Sheet 3

METHOD OF MAKING PHOTOCONDUCTIVE FILM

Figure 1:
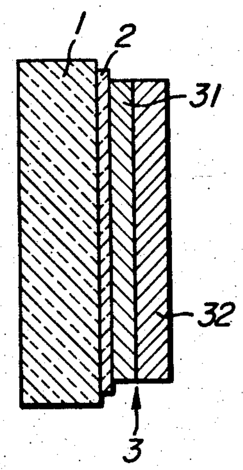

This invention relates to a method of making a photoconductive film used in a device for converting a light signal to an electrical signal, such as a vidicon, and more particularly to a method of enhancing the sensitivity of a photoconductive film having a hetero junction comprising an n type film of a group II – VI compound and a p type film of a vitreous material.

Generally, the target of the conventional pick-up tube, such as a vidicon, used for converting a light signal into an electrical signal is formed by successively depositing on the back side of a transparent face plate a transparent electrode, and a photoconductive film (target element). The photoconductive film is scanned with an electron beam produced by an electron gun.

The photoconductive film used for such a pickup tube should satisfy the following conditions, generally.

1. The dark resistance per scanned area (about 9 mm × 12 mm) should be above about $10^{10}$ Ω.

2. The electrostatic capacitance of the scanned area should be in the range of about 600 to 3,000 pF.

3. The spectral sensitivity curve should be in a predetermined wavelength region.

As photoconductive film satisfying these conditions, there have been proposed various films such as pn junctions of semiconductor, photovoltaic (photodiode) type films composed of a combination of a semiconductor and an electrode making a blocking contact, and photoconductive type films consisting of a semiconductor and an electrode making ohmic contact therewith.

These photoconductive films have, however, respective advantages and disadvantages in such points as linearity with respect to the incident beam intensity, response speed, temperature characteristics, clarity of an image, and difficulty of manufacture and have not been satisfactory.

Recently, there has been proposed a photoconductive film superior in the above characteristics which comprises a hetero junction of a vitreous material mainly composed of Se and including at least one of the group consisting of Te, As, Sb, Bi and S, and a group II – VI compound semiconductor such as ZnSe and CdSe or a mixture thereof.

This photoconductive film has many advantages such as less dark current, faster response, and wider sensitive wavelength region compared with the conventional ones, but is yet unsatisfactory for various uses. Thus, there is a need for photoconductive films of higher sensitivity.

An object of this invention is to provide a method for enhancing the sensitivity of said hetero junction photoconductive film.

According to the invention, there is provided in a method for making a photoconductive film having a hetero junction comprising the steps of successively depositing, on a transparent electrode deposited on a transparent face plate, an n type film comprising a group II – VI compound and a p type film including selenium, said method comprising the steps of heat treating said n type film in an atmosphere composed of one selected from the group consisting of group VI elements, hydrides of group VI elements, hydrogen, nitrogen, inert gases and the mixtures thereof at a temperature of 300° to 800° for 15 minutes to 5 hours, and then depositing said p type film.

Figure 2:
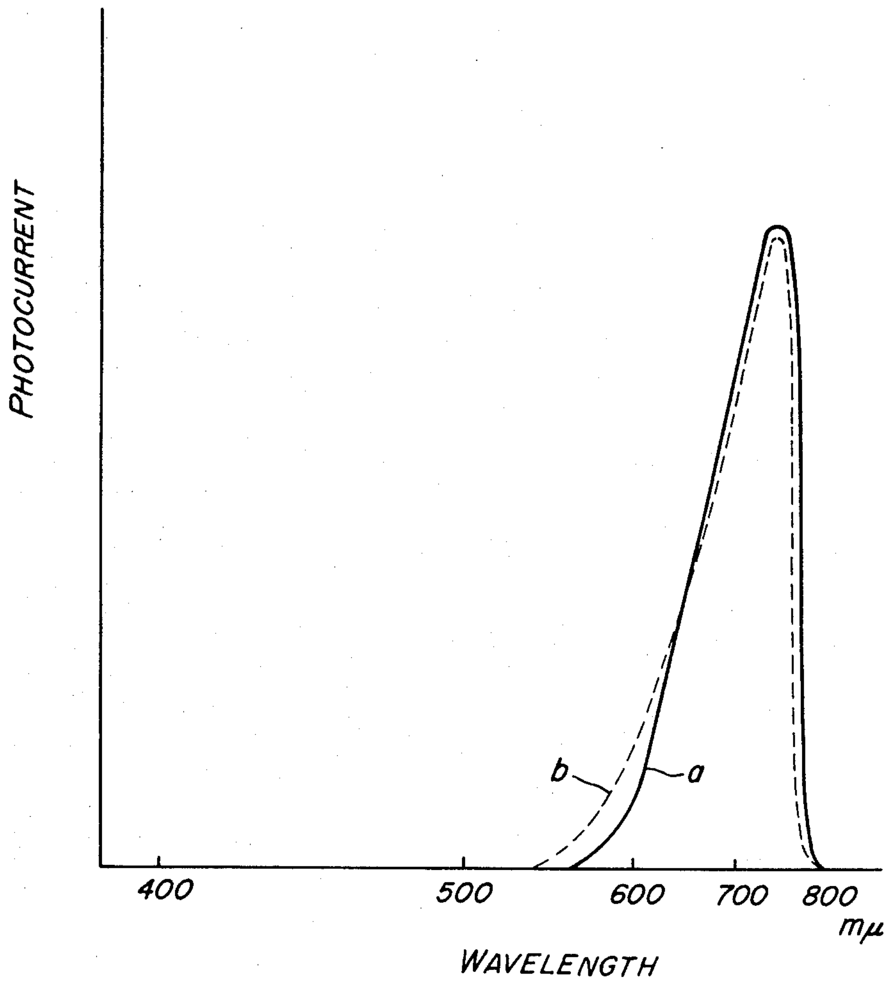
Figure 3:
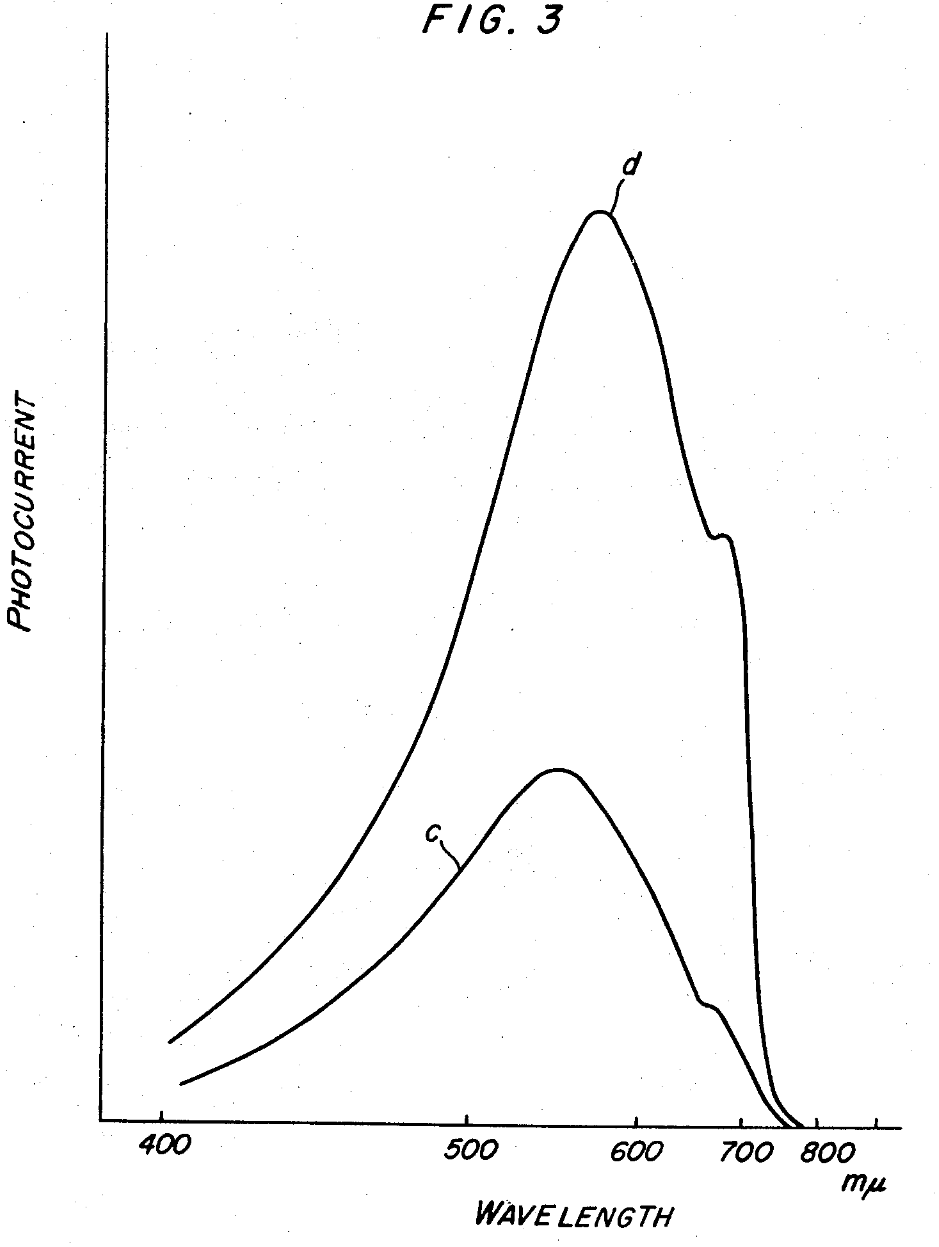

Description will be made hereinbelow in connnection with the annexed drawings, in which:

FIG. 1 is a cross-sectional diagram illustrating the structure of the light receiving portion of a vidicon; and FIGS. 2 and 3 are spectral photocurrent curves showing the influence of heat treatment on the spectral sensitivity characteristics of a CdSe film and a photoconductive film having a hetero junction, respectively.

The properties of a group II – VI compound as a photoconductive film, such as crystal perfection and resistivity, can be improved by heat-treating the film in an inert gas atmosphere at an appropriate temperature and for an appropriate period of time.

In vacuum depositing a group II – VI compound, a group VI element is more easily lost than a group II element to provide a film having an excess of group II element since the boiling points of group VI elements are lower than those of group II elements. Thus, when a vapor deposited film of a group II – VI compound is heat treated in an atmosphere including the group VI element to supply the group VI element, said characteristics are further improved than in the case of heat-treating in an inert gas atmosphere, providing a more preferable photoconductive film.

The sensitizing effect of a photoconductive film by the heat treatment as described above differs in its mechanism for the case of solely usqng a film of a group II – VI compound and the case of using a hetero junction formed by depositing a vitreous film mainly composed of Se on a film of a group II – VI compound.

In the case of using a group II – VI compound film solely, the sensitizing effect in a low illumination region of about 1 to 10 luxes is considered due rather to a decrease in the dark current $I_d$ than to an increase in the photocurrent $I_s$, hence increasing the ratio $I_s/I_d$. In this case, nothing is known for the sensitizing effect when the dark current $I_d$ is preliminary suppressed by some other means. This invention relates to the sensitizing effect in a photoconductive film having a hetero junction and the sensitizing effect was clearly observed even in photoconductive films of very low dark current.

This invention will be described in more detail hereinbelow by way of an embodiment.

The spectral sensitivities were compared by measuring photocurrents at various wavelengths for the following two cases; (a) when a CdSe film 31 of a thickness 1,000 A. was deposited on a transparent electrode 2 formed of $SnO_2$ provided on a glass substrate 1 and no heat treatment was done, and (b) when a CdSe film was deposited in a similar manner and then heat treated in oxygen atmosphere of 1 atmospheric pressure at 400°C for 1 hour. The result is shown in FIG. 2, from which one can see that the spectral sensitivity of a CdSe film with heat treatment *b* is almost the same as that of a CdSe film without heat treatment *a* and that no increase can be observed in the photocurrent by said heat treatment.

However, when a chalcogen glass 32 of a thickness of about 2 μ composed of 80 atom percent of Se, e, 10 atom percent of Te, and 10 atom percent of As was deposited on said CdSe fiom 31 to form a composite photoconductive film 3 and the sensitizing effect of said heat treatment was measured in such a composite film, a completely different result was obtained.

More particularly, dark currents and photocurrents were measured under illumination of 1.25 and 10 luxes, respectively, for one formed of said CdSe film provided with the deposition of said chalcogen glasf film without said heat treatment and another formed of said CdSe film first heat treated and then provided with the deposition of said chalcogen glass film, and the result as shown in Table 1 was obtained.

TABLE 1

| | dark current (nA) | Photocurrent ( nA ) illumination 1.25 luxes | illumination 10 luxes |
|---|---|---|---|
| one having non-heat treated CdSe film | 1 | 45 | 260 |
| one having heat treated CdSe film | 1 | 150 | 900 |

As is apparent from Table 1, the dark current of photoconductive films having a hetero junction is same regardless of the heat treatment on CdSe films, but the photocurrent increases remarkably by the heat treatment on the CdSe film. It is apparent that photocurrent enhancement type sensitization is done even for a very low illumination below 10 luxes and that this is clearly different from the case of single CdSe film.

Further, the heat treatment of a CdSe film is a very effective not only for the increase of the sensitivity in a photoconductive film having a hetero junction but also for the control and expansion of the sensitive wavelength region.

That is, a hetero junction photoconductive film having a non-heat treated CdSe film has a sensitivity peak in a green light region around 550 m $\mu$ as is shown by curve *c* in FIG. 3, but one having a heat treated CdSe film has considerably large sensitivity peak also in a red light region around 700 m $\mu$ as well as the peak around 500 m$\mu$, as is shown by curve *d* in FIG. 3. This shos that sensitivity control for red light is possible. In the case of using only a CdSe film, alternation of spectral sensitivity by heat treatment is impossible as is apparent from FIG. 2. Thus, the above effect is unique for a photoconductive film having a hetero function.

Now, the mechanism of sensitization of such a photoconductive film having a hetero junction is described.

Current I flowing through a photoconductive body can be expressed generally by the sum of dark current $I_d$ and photocurrent $I_s$, $$I = I_d = I_s \tag{2}$$

Further, the sensitivity S of a photoconductive body can be expressed by the ratio of $I_s$ to $I_d$, $$S = I_s/I_d \tag{2}$$

Photocurrent $I_s$ is generally proportional to the product of increment of carriers due to light illumination $\Delta n$, applied electric field E, and the mobility $\mu$ n, $$I_s \alpha \Delta n \mu_n E \tag{3}$$

In a stationary state, increment $\Delta n$ is expressed by the product of the density of atoms excited per unit time $g$ and the lifetime of a carrier $\tau$, $$\Delta n - g \tau \tag{4}$$

Thus, from equations (3) and (4), $$I_s \alpha g \tau \mu_n E \tag{5}$$

Assuming that $g$ and E are constant, the increase in $I_s$ should come from the increase in $\tau$ or $\mu_n$.

The fact that no increase was observed by a heat treatment under low illumination in the case of solely using a CdSe film shows that the increases of $\tau$ and $\mu_n$ are not so remarkable.

According to the present invention, a remarkable increase in $I_s$ was observed as the result of a heat treatment. This is essentially due to the use of a hetero junction and can be considered as that the resistivity of CdSe near the hetero junction is controlled by the heat treatment to a preferable value, hence the magnitude of electric field distributed in the CdSe film is varied, and the utilization efficiency of carriers generated in the CdSe film by light illumination increases.

In the above embodiment, the n type compound was CdSe, and the p type material was Se (including As, Te), but it is apparent that the present invention is not limited to these materials.

Namely, as the n type compound, many other group II – VI compounds and mixtures of group II – VI compounds, such as sulphides, selenides, and tellurides of Cd and Zn, and mixtures thereof can be used as well as CdSe.

Further, for the p type material many materials mainly composed of Se are possible, where other material to be mixed with Se can be appropriately selected from S, Te, Sb, Bi, As, etc. and the content thereof can also be widely varied.

As for the temperature at which the n type film is heat treated; below 300°C the effect is little and above 800°C the crystal grains become so large that when used as a vidicon target, unevenness in the image plane becomes conspicuous. Thus, the heat treatment can appropriately be done at a temperature of 300° to 800°C but more preferable at 400° to 800°C, and for 15 minutes to 5 hours but more preferably for 0.5 to 2 hours.

The atmosphere in which the heat treatment is done is preferably composed of not only $O_2$ but also single elements of group VI such as Se and S, or compounds containing at least one of them such as hydrides such as $H_2S$, $H_2Se$. It may also be one of $H_2$, $N_2$, inert gases such as Ar, Ne and the mixtures thereof.

What we claim is:

1. In a method for making a photoconductive film having a hetero junction comprising the steps of successively depositing, on a transparent electrode deposited on a transparent face plate, an n type film comprising a group II – VI compound and a p type film including selenium, said method comprising the steps of heat treating said n type film in an atmosphere composed of one selected from the group consisting of group VI elements, hydrides of group VI elements, hydrogen, nitrogen, inert gases and the mixtures thereof at a temperature of 300° to 800°C for 15 minutes to 5 hours, and then depositing said p type film.

2. A method according to claim 1, in which said group VI element is oxygen.

3. A method according to claim 1, in which said group VI element is sulphur.

4. A method according to claim 1, in which said group VI element is selenium.

5. A method according to claim 1, in which said hydride is water vapor.

6. A method according to claim 1, in which said hydride is hydrogen sulphide.

7. A method according to claim 1, in which said hydride is hydrogen selenide.

8. A method according to claim 1, in which said heat treatment is done at a temperature of 400° to 800°C.

9. A method according to claim 1, in which said heat treatment is done for 30 minutes to 2 hours.

10. A method according to claim 1, in which said group II – VI compound is formed of at least one selected from the group consisting of sulphides, selenides, and tellurides of cadmium and zinc.

11. A method according to claim 1, in which said p type film is mainly composed of selenium and further includes at least one selected from the group consisting of sulphur, tellurium, antimony, bismuth and arsenic.

* * * * *

UNITED STATES PATENT OFFICE
CERTIFICATE OF CORRECTION

Patent No. 3,755,002 Dated August 28, 1973

Inventor(s) Tadaaki Hirai, Eiichi Maruyama, Kiyohisa Inao

It is certified that error appears in the above-identified patent and that said Letters Patent are hereby corrected as shown below:

Title page, correct the following:

[30] Foreign Application Priority Data

April 14, 1971 Japan ................ 46/23086

Signed and sealed this 18th day of December 1973.

(SEAL)
Attest:

EDWARD M. FLETCHER, JR.
Attesting Officer

RENE D. TEGTMEYER
Acting Commissioner of Patents